United States Patent
Wei (10) Patent No.: US 8,848,843 B2
(45) Date of Patent: Sep. 30, 2014

(54) METHOD AND ASSOCIATED APPARATUS OF COMMUNICATION PARAMETER DETECTION

(71) Applicant: MStar Semiconductor, Inc., Hsinchu County (TW)

(72) Inventor: Fong-Shih Wei, New Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 153 days.

(21) Appl. No.: 13/678,711

(22) Filed: Nov. 16, 2012

(65) Prior Publication Data

US 2013/0129022 A1 May 23, 2013

(30) Foreign Application Priority Data

Nov. 18, 2011 (TW) .............................. 100142404 A (51) Int. Cl.
*H04B 17/00* (2006.01)

(52) U.S. Cl.
CPC .............. *H04B 17/00* (2013.01); *H04B 17/007* (2013.01)
USPC ....................................................... 375/343

(58) Field of Classification Search
USPC .......................... 375/150, 260, 316, 340, 343
See application file for complete search history.

(56) References Cited

U.S. PATENT DOCUMENTS

| 6,125,124 A * | 9/2000 | Junell et al. ................... 370/503 |
| 7,447,277 B2 * | 11/2008 | Yajima et al. .................. 375/326 |
| 2005/0147186 A1 * | 7/2005 | Funamoto et al. ............ 375/324 |
| 2008/0069154 A1 | 3/2008 | Yang et al. |

* cited by examiner

*Primary Examiner* — Khanh C Tran
(74) *Attorney, Agent, or Firm* — Edell, Shapiro & Finnan, LLC (57) ABSTRACT

A method of communication parameter detection for detecting a temporal length of a guard interval of cyclic messages in a communication is provided. The method includes: searching peaks of an autocorrelation signal in the communication signal, and providing a peak for each cyclic message; sorting a time difference between two consecutive peaks to one of bins of a histogram, and determining the temporal length of the guard interval according to a result of the histogram; while a peak is found, providing a signal average according to an average of the autocorrelation signal over an average calculating period, comparing whether a ratio of the peak to the signal average is greater than a threshold, and accordingly detecting whether the communication signal carries valid information.

18 Claims, 6 Drawing Sheets

METHOD AND ASSOCIATED APPARATUS OF COMMUNICATION PARAMETER DETECTION

This application claims the benefit of Taiwan application Serial No. 100142404, filed Nov. 18, 2011, the subject matter of which is incorporated herein by reference.

BACKGROUND OF THE INVENTION

1. Field of the Invention

The invention relates in general to a method and associated apparatus of communication parameter detection, and more particularly to a method and associated apparatus of communication parameter detection for detecting a temporal length of a guard interval based on a histogram and capable of detecting whether a communication signal carries valid information.

2. Description of the Related Art

Various communication systems, particularly wireless communication systems, are prevalent in the modern information society. For example, a wireless communication system based on an orthogonal frequency division multiplexing (OFDM) technique is a common wireless communication system. Specifications from IEEE 802.11a wireless local area network standards, IEEE 802.16 wireless metropolitan network standards to Digital Video Broadcasting (DVB) standards developed in the Euro zone all implement OFDM techniques.

In an OFDM wireless communication system, to transmit a radio frequency (RF) communication signal for transmission or broadcasting, information to be transmitted (or broadcasted) is coded and constellation mapped to carry the information in a series of complex frequency domain coefficients of orthogonal carriers. In equivalence, a complex inverse frequency domain transform (e.g., inverse Fast Fourier Transform (FFT)) is performed on the coded and constellation mapped information to be transmitted to form a symbol in a baseband communication signal. For protection against inter-symbol interference (ISI) resulted by multipath transmissions in a wireless transmission environment, between every two symbols of a baseband communication signal is provided with a guard interval. Each guard interval is filled with a cyclic message, e.g., a cyclic prefix (CP). A cyclic prefix of a symbol is a repetition of a last part of the symbol. That is, a length at the last part of the symbol that equals a part as the guard interval is filled to the guard interval to serve as a cyclic prefix of the symbol. The baseband communication signal added with the cyclic message may be up-converted to an RF communication signal and then to an analog wireless signal, which is transmitted in form of a wireless wave.

In an OFDM wireless communication system, corresponding processes are performed when a receiver receives the analog wireless signal transmitted from the transmitter. More specifically, the analog wireless signal is down-converted to/sampled as a digital discrete baseband communication signal, from which the cyclic message is removed. Complex frequency domain transform (e.g., FFT) is performed followed by constellation inverse-mapping and decoding, so as to retrieve the information carried in the communication signal.

To adapt to different wireless communication environments, an OFDM wireless communication system may adopt communication signals of different modes. In the communication signals of different modes, a temporal length between two consecutive cyclic messages may vary. Further, even for communication signals of a same mode, a temporal length of the guard interval may also be selected from multiple possible candidate guard intervals.

For example, communication signals exist in 2K, 4K and 8K modes. Under the 2K mode, the time (to be referred to as a first period L1) between two consecutive cyclic messages covers 2048 sampling points in the communication signal. Similarly, under the 4K and 8K modes, the first period respectively covers 4096 and 8192 sampling points. Under a same mode, the period (to be referred to as a second period L2) of a guard interval may be ⅓₂, ¹⁄₁₆, ⅛ or ¼ of the first period L1. In other words, the transmitter may select one from the candidate guard intervals L1/32, L1/16, L1/8 and L1/4 to accordingly set the temporal length of the guard interval.

The transmitter does not clearly inform the receiver of the adopted mode and the temporal length of the guard interval. Thus, to detect the mode and the temporal length of the guard interval of the received communication signal, it is necessary that the receiver perform a blind test for communication parameters according to the received communication signal. Only based on known mode and temporal length of the guard interval of the communication signal, the receiver can correctly remove the cyclic messages and perform frequency domain transform to correctly retrieve the information in the communication signal.

In a conventional technique of communication parameter detection, the receiver exhaustively tests the communication signal with respect to all candidate guard intervals under all modes one after another to determine whether the communication signal matches any of the candidates. More specifically, assuming the communication system has N_of_mode number of modes each having N_of_GI guard intervals, the convention technique performs N_of_mode*N_of_GI tests on the communication signal to confirm the mode and the guard interval of the communication signal. It is apparent that such exhaustive test process consumes a great amount of time for the communication parameter detection and hence disfavors the communication efficiency.

Further, in the event that the transmitter does not designate any meaningful, valid information to the communication signal, the communication signal received at the receiver contains only noise. At this point, the receiver is expected to recognize that the communication signal does not contain valid information. However, in the conventional technique, valid information detection cannot be concurrently carried out with the communication parameter detection. Only after the communication parameters are detected, the convention technique is then able to determine whether the information is valid or meaningless according the information obtained from frequency domain transform, inverse mapping and decoding. Hence, the conventional technique fails in promptly determining the validity of the communication signal.

SUMMARY OF THE INVENTION

To mitigate shortcomings of the convention technique, the invention is directed to a method and associated apparatus of communication parameter detection applied to a communication signal (e.g., a baseband communication signal). The communication signal includes a plurality of cyclically arranged cyclic messages each lasting for a duration of a guard interval. Apart from quickly detecting a temporal length of the guard interval, the present invention is also capable of detecting whether the communication signal carries meaningful, valid information.

According to an object the present invention, a method of communication parameter detection is provided. The method includes: providing an autocorrelation signal according to a communication signal, searching peaks in the autocorrelation signal to provide a corresponding peak for each cyclic message, performing a histogram counting to sort a time difference between two consecutive peaks to one of a plurality of bins to accordingly determine a temporal length according to a result of the histogram counting.

When calculating the autocorrelation signal, the autocorrelation signal may be provided according to a shortest of the candidate guard intervals. For example, the step of providing the autocorrelation signal includes: delaying the communication signal by a delay period to generate (provide) a delay signal, setting an accumulation period according to the shortest of the candidate guard intervals, and accumulating (adding up) a product of the communication signal and the delay signal in the accumulation period. Further, the temporal length of the delay period may be set according to a first period. For example, the delay period may equal a first period L1 under a specific mode.

The step of searching the peaks in the autocorrelation signal may include: comparing a current value of the autocorrelation signal with the peak; updating the peak with the current value when the current value is greater than the peak, or else keeping the peak unchanged; and triggering a peak flag when a period of keeping the peak unchanged gets greater than a peak calculating period. For example, the peak calculating period is set according to the first period such that the peak calculating period is smaller than the delay period.

When performing the histogram counting, the number of bins is set according to the number of the candidate guard intervals so as to allow a range of the bins respectively correspond to the candidate guard intervals. If majority of the time difference of the peaks are sorted to a specific bin, the temporal length of the communication signal then equals the candidate guard interval corresponding to the bin.

Further, the step of triggering the peak flag and obtaining the peak includes: providing a signal average according to an average of the autocorrelation signal over an average calculating period, comparing whether a ratio of the peak to the signal average is greater than a threshold, and accordingly detecting whether the communication signal carries valid information. If the ratio is greater than the threshold, it is determined that the communication signal carries valid information.

According to another object of the present invention, an apparatus of communication parameter detection provided. The apparatus includes an auto correlator, a peak searcher, a histogram counter, and a ratio calculator. The auto correlator provides an autocorrelation signal according to a communication signal. The peak searcher, coupled to the auto correlator, searches peaks in the autocorrelation signal to provide a corresponding peak for each cyclic message. The histogram counter, coupled to the peak searcher, performs a histogram counting to sort a time difference between two consecutive peaks to one of a plurality of bins, so as to enable the apparatus of the present invention to determine a temporal length of a guard interval according to a result of the histogram counting. The ratio calculator, coupled to the peak searcher, provides a signal average according to an average over an average calculating period after a peak flag is triggered, and compares whether a ratio between the peak and the signal average is greater than a threshold to accordingly determine whether the communication signal carries valid information.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
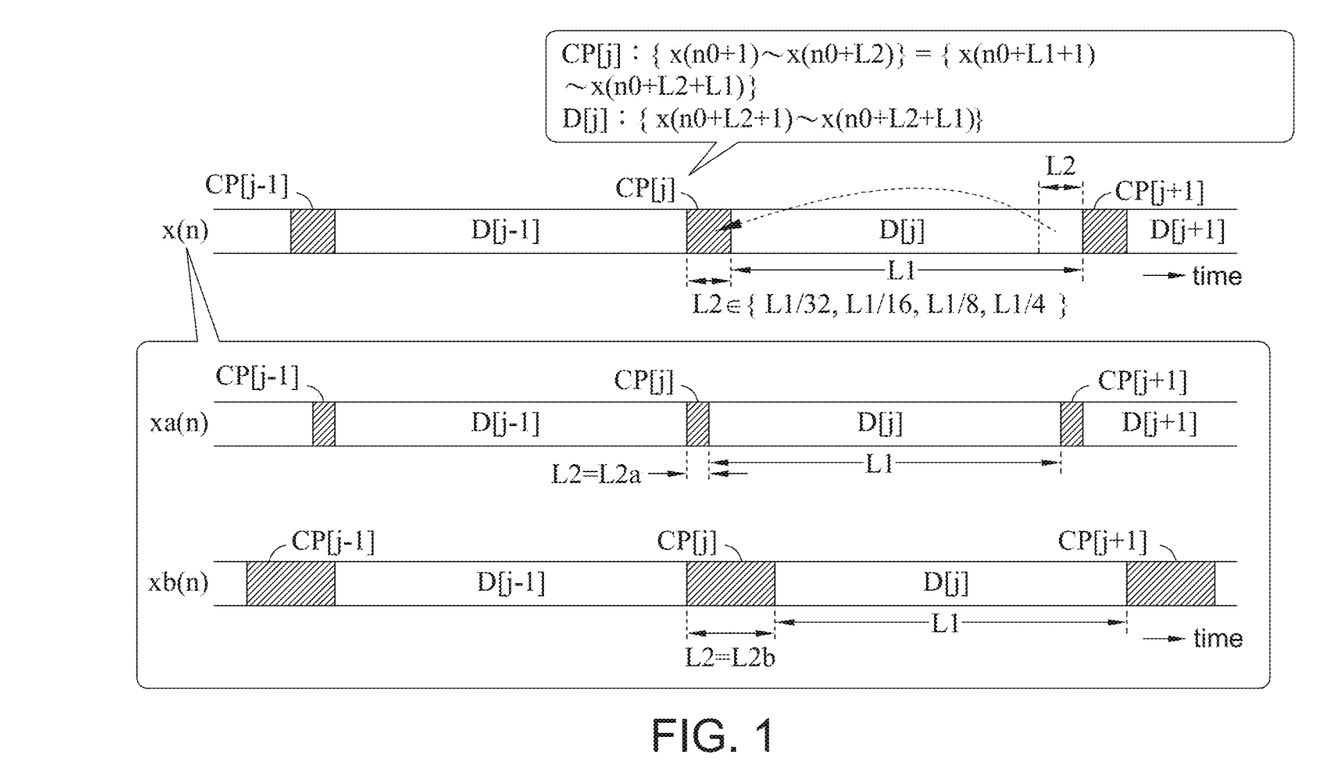
FIG. 1 is a timing diagram of a communication signal.

FIG. 1 shows a timing diagram of a signal x(n). For example, the signal x(n) is a communication signal, such as a baseband communication signal in a receiver of a wireless communication system. The signal x(n) includes a plurality of sequentially arranged sections. In FIG. 1, sections CP[j−1], D[j−1], CP[j], D[j], CP[j+1] and D[j+1] are depicted as examples. The sections D[j−1], D[j] and D[j+1] are data sections carrying information to be transmitted by a transmitter. The sections CP[j−1], CP[j] and CP[j+1] before the sections D[j−1], D[j] and D[j+1] are cyclic message sections, i.e., cyclic messages as a prefix of the data sections (cyclic prefix), respectively corresponding the data sections D[j−1], D[j] and D[j+1]. The cyclic message sections CP[j] and the data sections D[j] are alternately arranged. That is, the data section D[j] is between two consecutive cyclic message sections CP[j] and CP[j+1], and the cyclic message section CP[j] is between two consecutive data sections D[j−1] and D[j]. The duration of the cyclic message section CP[j] equals a guard interval between the consecutive data sections D[j−1] and D[j].

The lengths of the data sections D[j−1], D[j] and D[j+1] are consistently equal to a period L1 (i.e., a first period); the temporal lengths (i.e., the guard interval) of the cyclic message sections CP[j−1], CP[j] and CP[j+1] are consistently equal to a period L2 (i.e., a second period). The length of the periods L1 and L2 may be represented by the number of signal sampling points. For example, the cyclic message section CP[j] may include L2 number of signal samples x(n0+1) to x(n0+L2), whereas the corresponding data section D[j] covers L1 number of signal samples x(n0+L2+1) to x(n0+L2+L1). Since the sections CP[j] and D[j] are alternately arranged, between two successive cyclic message sections CP[j−1] and CP[j] and between two successive data sections D[j−1] and D[j] are a period (L1+L2). For example, the signal samples x(n0+L2+1) to x(n0+L2+L1) in the section D[j] are respectively spaced from the signal samples x(n0−L1+1) to x(n0) in the section D[j−1] by (L1+L2) signal samples.

In the prefixing cyclic message section CP[j] of the data section D[j], the last L2 number of signal samples of the data section D[j] are repeated. That is to say, the L2 number of signal samples x(n0+1) to x(n0+L2) in the section CP[j] respectively equal to the last L2 number of signal samples x(n0+L2+1) to x(n0+L2+L1) in the section D[j].

As previously mentioned, the length of the period L1 is associated with wireless communication mode adopted at the transmitter. For example, under 2K and 4K modes, the period L1 may respectively be 2048 and 4096 sampling points. The length of the period L2 (i.e., the guard interval) is selected from a plurality of candidates by the transmitter. For example, the candidate guard interval may be a period L1/32, L1/16, L1/8 or L/4. As a result, even with a period L1 in a constant length, the timing of the signal x(n) nevertheless changes based on different lengths of the period L2.

In FIG. 1, timings xa(n) and xb(n) are two possible timings of the signal x(n) and respectively corresponding to shorter and longer periods L2. In the timing xa(n), the period L2 is set as a shorter period L2a so that the cyclic message sections CP[j] are also shorter. In contrast, in the timing xb(n), a longer period L2b is selected as the period L2 to correspondingly result in longer cyclic message sections CP[j].

It should be noted that the transmitter does not clearly inform the receiver of the temporal length of the guard interval. Thus, it is necessary that the receiver detect the length of the period L2 from the signal x(n) before decoding the signal x(n).

Figure 2:
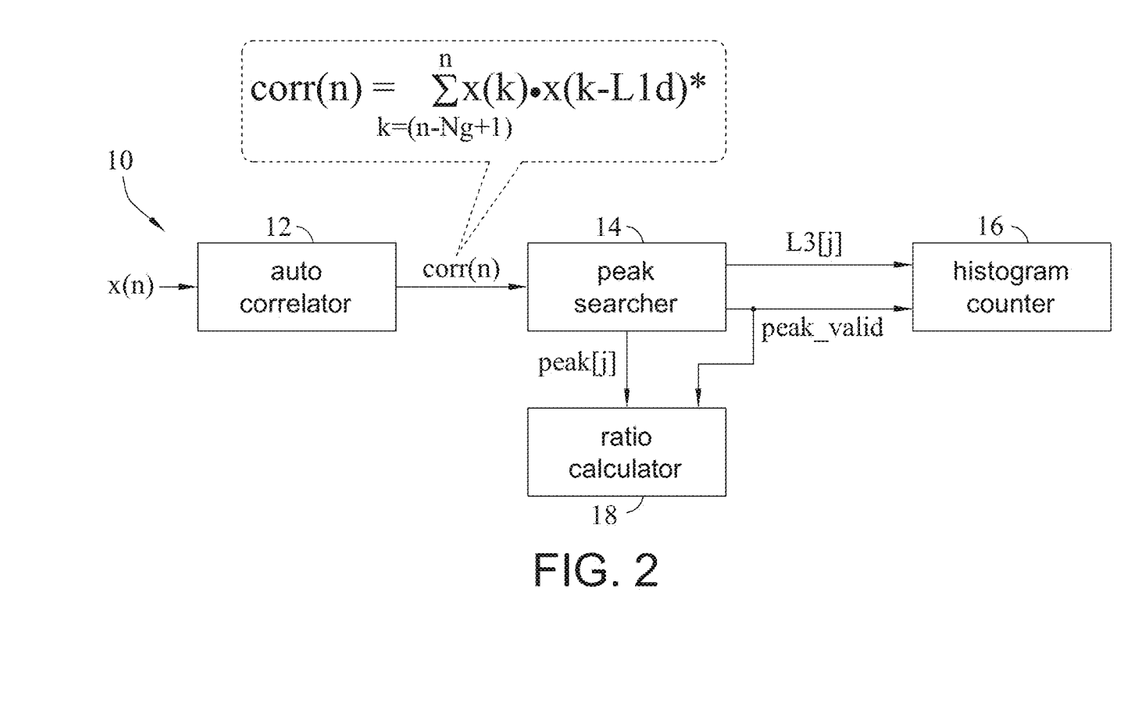
FIG. 2 is a schematic diagram of an apparatus according to an embodiment of the present invention.
Figure 3:
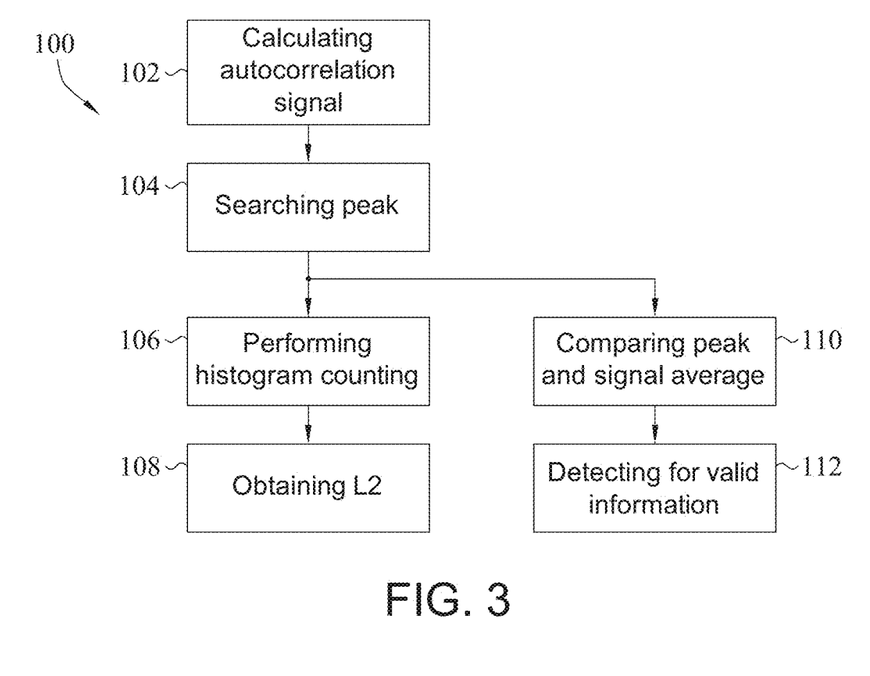
FIG. 3 is a schematic diagram of a process according to an embodiment of the present invention.
Figure 4:
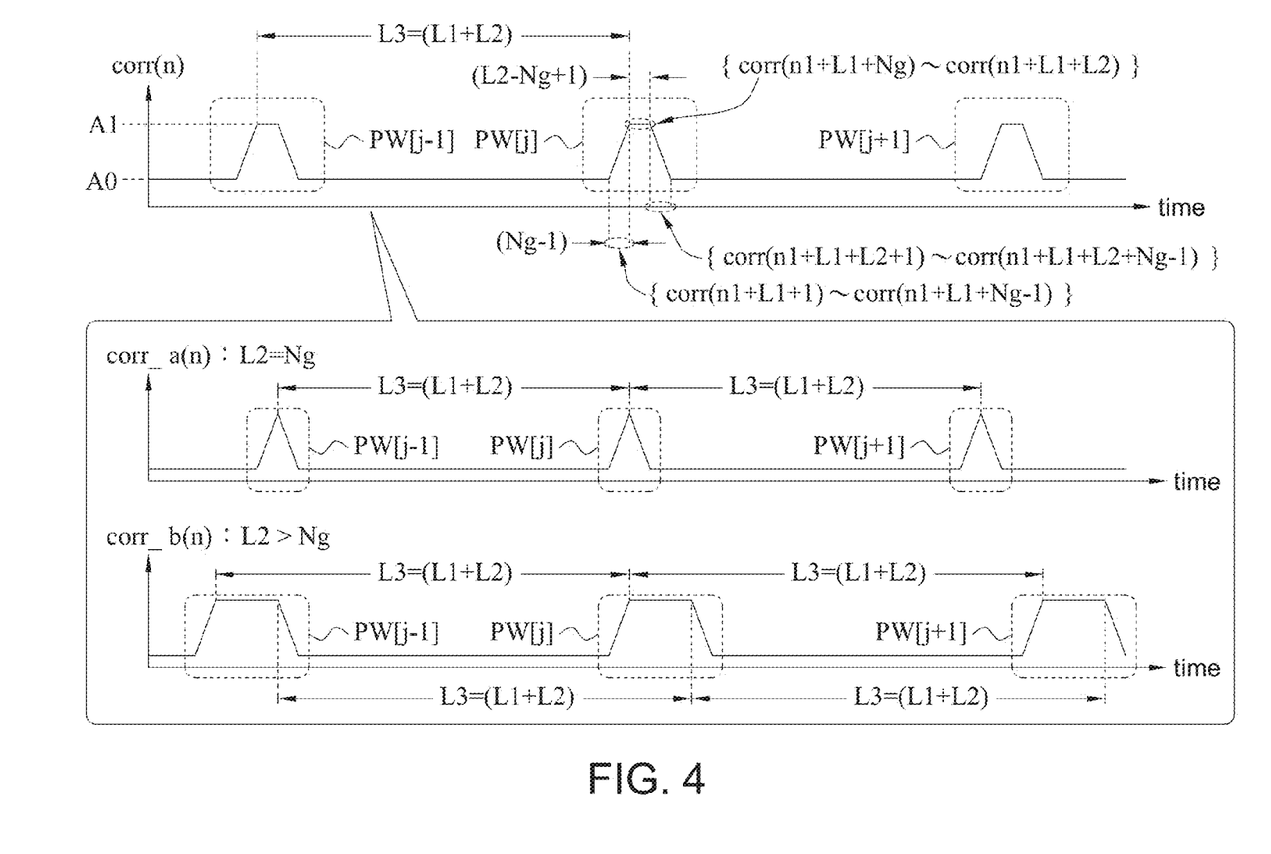
FIGS. 4 to 6 are schematic diagrams illustrating associated operations according to the embodiments shown in FIGS. 2 and 3.
Figure 5:
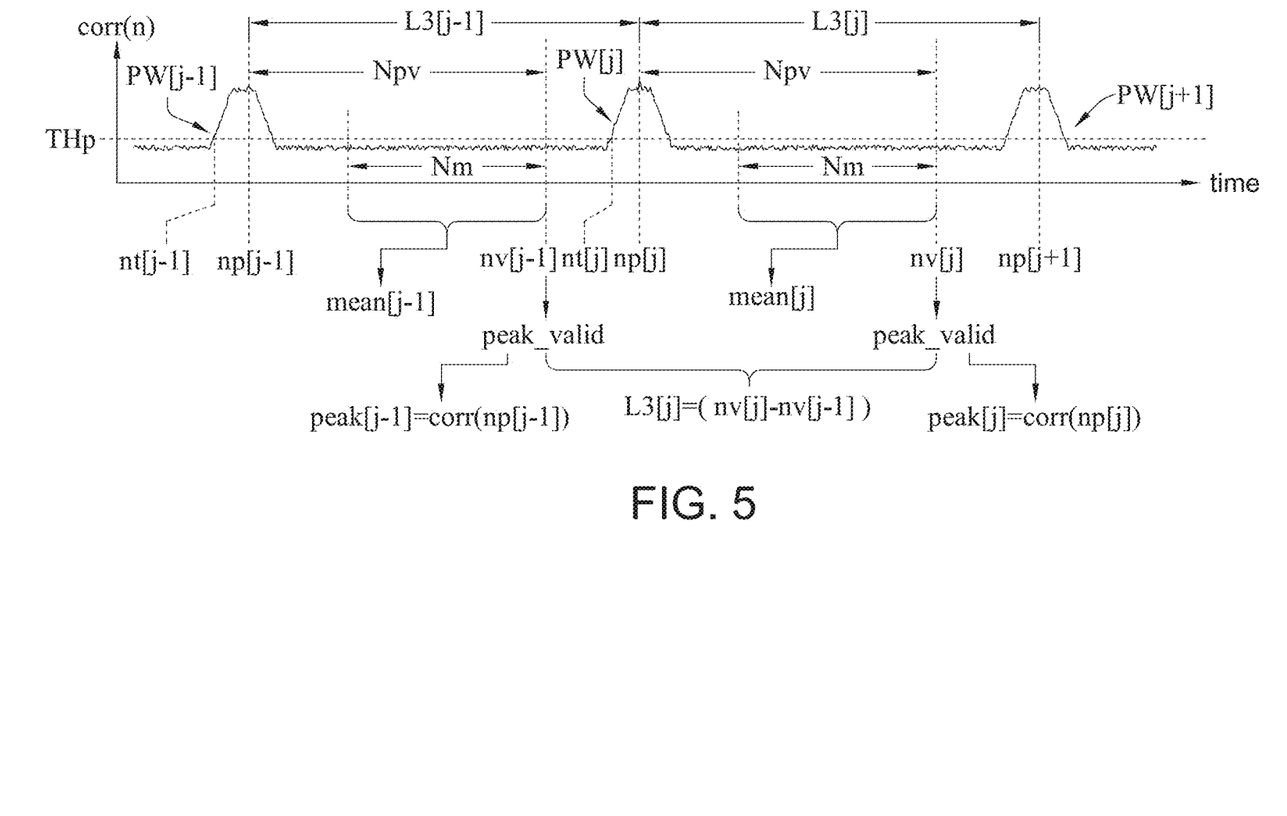
Figure 6:
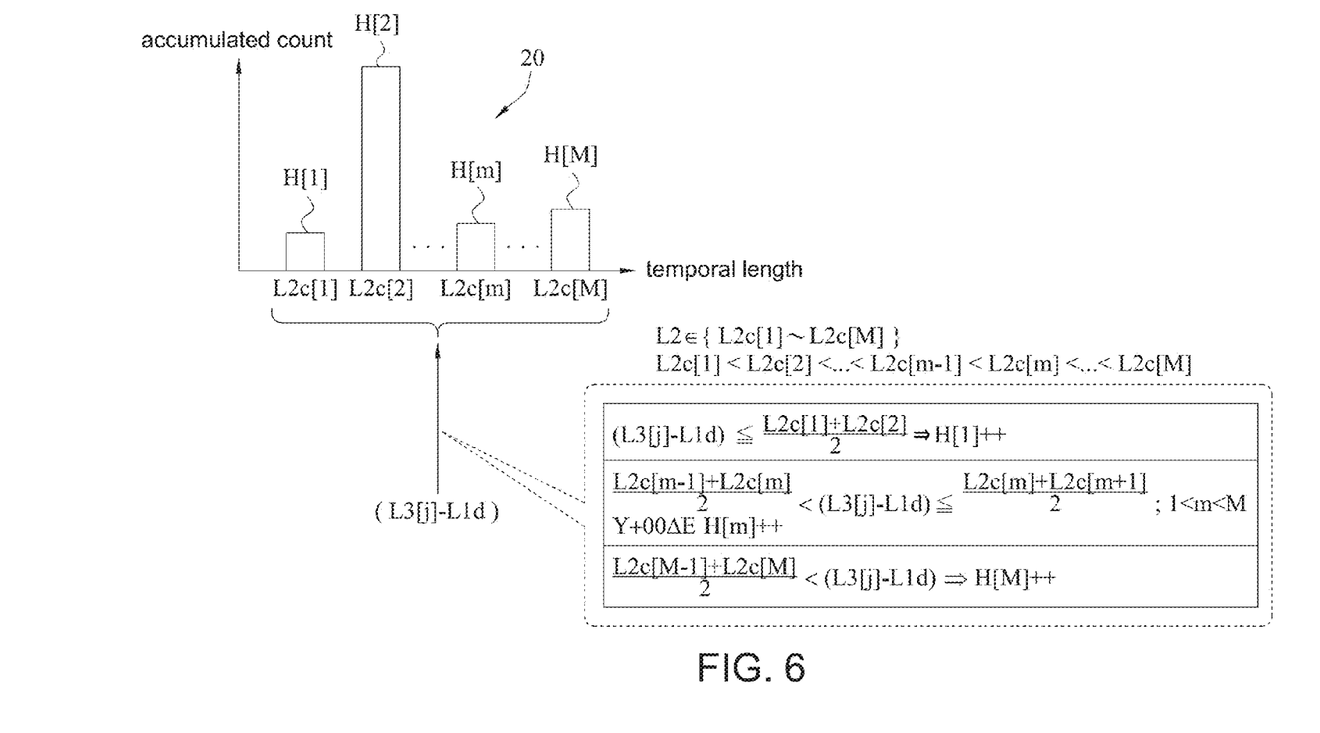

The description below shall be given with reference to FIGS. 2 to 6. FIG. 2 shows a schematic diagram of an apparatus 10 according to an embodiment of the present invention. FIG. 3 shows a process 100 according to an embodiment of the present invention. The apparatus 10 may be integrated in the receiver to execute the flow 100, so as to detect the temporal length of the guard interval L2 of the communication signal x(n) in FIG. 1 and at the same time to detect whether the signal x(n) contains valid information. FIGS. 4 to 6 show waveforms and timings of associated signals in FIGS. 2 and 3 as examples for illustrating operations of the invention.

Referring to FIG. 2, the apparatus 10 comprises an auto calculator 12, a peak searcher 14, a histogram counter 16 and a ratio calculator 18. The peak searcher 14 is coupled between the auto correlator 12, the histogram counter 16 and the ratio calculator 18. Operations of the auto correlator 12, the peak searcher 14, the histogram counter 16 and the ratio calculator 18 shall be illustrated with reference to steps of the process 100 in FIG. 3 below.

In Step 102, a value of a delay period L1d is set, and a signal corr(n) is provided by the auto correlator 12 according to the signal x(n). The signal corr(n) is an autocorrelation signal of the signal x(n). FIG. 2 also shows an example for defining the signal corr(n). The auto correlator 12 delays the signal x(n) by the delay period L1d to provide a delay signal x(n−L1)*, and sets an accumulation period Ng according to a shortest candidate guard interval of the candidate guard intervals. A product of the signal x(n) and the delay signal x(n−L1d) is accumulated in the accumulation period Ng to accordingly calculate the value of the signal corr(n). In an embodiment, the signal x(n) is a complex signal synthesized from an in-phase signal and a quadrature-phase signal. The in-phase signal and the quadrature-phase signal respectively correspond to a real part and an imaginary part of the complex signal. The delay signal x(n−L1d) is formed from a conjugate after delaying the signal x(n).

In an embodiment of the invention, the accumulation period Ng may equal to the shortest of the candidate guard intervals. For example, assuming the candidate guard intervals are L1/32, L1/16, L1/8 and L1/4, the accumulation period may equal L1/32.

FIG. 4 shows a waveform (an absolute waveform) of the signal corr(n). As previously stated, in the signal x(n), the last L2 number of signal samples in the section D[j] that equal the signal samples in the section CP[j] and the temporal length of the section D[j] are the period L1. Hence, when calculating the value of the signal corr(n) according to the last L2 number of signal samples of the section D[j], the peak window PW[j] in higher values is formed due to high autocorrelation of the signal corr(n) if the delay period L1d equals the period L1 selected at the transmitter, as shown in FIG. 4. Similarly, the signal corr(n) also includes peak windows PW[j−1] and PW[j+1], which respectively correspond to the sections CP[j−1], D[j−1], and CP[j+1], D[j+1]. In contrast, when calculating the value of the signal corr(n) at other time points of the signal x(n), the signal corr(n) is maintained at a low value A0 due to low autocorrelation. Supposing the delay period L1d does not equal the period L1, the signal corr(n) is still maintained at the low value A0 due to low autocorrelation. In other words, the delay period L1d may be regarded as a predicted value for predicting the temporal length of the period L1. Therefore, the temporal length of the delay period L1d may equal the period L1 of a particular mode when setting the delay period L1d.

Referring to FIG. 4, when the delay period L1d equals the period L1 selected at the transmitter, the signal corr(n) in the peak window PW[j] gradually increases from the signal samples corr(n1+L1+1) to corr(n1+L1+Ng−1) to reach and maintain at a peak having a value A1, and gradually decreases from the signal samples corr(n1+L1+L2+1) to corr(n1+L1+L2+Ng−1). Since the two successive cyclic message section CP[j−1] and CP[j] (FIG. 1) and the two successive data sections D[j−1] and D[j] are both spaced by the period (L1+L2), the two successive peak windows PW[j−1] and PW[j] are also spaced by the period (L1+L2). As shown in FIG. 4, the period (L1+L2) may then be defined as L3. For example, the peak window PW[j] between the signal samples corr(n1+L1+Ng) and corr(n1+L1+L2) is a peak, and the peak window PW[j−1] between the signal samples corr(n1−L2+Ng) to corr(n1) is a peak.

As observed from FIG. 4, an interval between successive peak windows reflects the temporal length of the period L2. For different temporal lengths of the period L2, the signal corr(n) also renders different waveforms. In FIG. 4, waveforms corr_a(n) and corr_b(n) respectively correspond to different lengths of the period L2. When the period L2 selected at the transmitter equals the accumulation period Ng of the signal corr(n) (FIG. 2), the signal corr(n) renders the waveform corr_a(n), with the period L3 between the successive peak windows being shorter. Conversely, when the period L2 is greater than the accumulation period (the accumulation period may equal to the shortest of the candidate guard intervals), the signal corr(n) renders the waveform coor_b(n), with the period L3 between the successive peak windows being longer. Therefore, in the present invention, the peak windows are to be searched and positioned based on the peaks, so as to detect the temporal length of the period L2 according to the period L3 between successive peaks.

In continuation of the process 100, in Step 104, the peak searcher 14 searches the peaks in the signal corr(n). As a result of the communication signal x(n) being affected by non-ideal factors including noises, communication channel attenuation and/or multipath interference, the autocorrelation signal of the communication signal x(n) is also undesirably affected, as depicted in FIG. 4. Operations of the peak searcher 14 according to an embodiment of the present invention are to be described shortly. The peak searcher 14 sequentially compares whether the signal corr(n) at different time points n is greater than a threshold THp, and begins searching when the signal corr(n) is greater than the threshold THp. More specifically, the peak searcher 14 compares a current value of the signal corr(n) at the time point n with a temporarily stored peak, and updates the peak to the current value if the current value is greater than the peak or else keeps the peak unchanged. When the duration of keeping the peak unchanged gets greater than a peak calculating period Npv, the peak searcher 14 triggers a flag peak_valid as a peak flag.

Taking FIG. 4 for example, if the signal sample corr(nt[j−1]) of signal corr(n) at the time point nt[j−1] is greater than the threshold, the peak searcher 14 starts to search the peaks after the time point nt[j−1]. The peak searcher 14 may first temporarily store the signal sample corr(nt[j−1]) at the time point nt[j−1] as a peak, and determine whether the value of the signal sample corr(nt[j−1]+1) at the next time point (nt[j−1]+1) after the time point nt[j−1] is greater than the temporarily stored peak corr(nt[j−1]). The peak is updated to the value of the signal sample corr(nt[j−1]+1) when a result is affirmative, or else the temporarily stored peak is kept as the value of the signal sample corr(nt[j−1]).

Assuming that the temporarily stored peak is kept as the signal sample corr(np[j−1]) after the time point np[j−1], and the duration of keeping the peak unchanged gets a greater than the peak calculating period Npv, the peak searcher 14 triggers the flag peak_valid at the time point nv[j−1](np[j−1])+Npv to indicate that the peak searcher 14 has found a peak peak[j−1] for the peak window PW[j−1]. The value of the peak equals the signal sample corr(np[j−1]) at the time point np[j−1] and corresponds to the cyclic message in the section CP[j−1].

After triggering the flag peak_valid at the time point nv[H], the peak searcher 14 resets the peak and the flag peak_valid to again compare whether the signal sample corr(n) at the time point n after the time point nv[j−1] is greater than the threshold THp, so as to search a next peak. For example, after the time point nv[j−1], upon determining that the value of the signal sample corr(nt[j]) at the time point nt[j] is greater than the threshold THp, the peak searcher 14 may start another round of peak search. After the period Npv, when the peak searcher 14 confirms that the signal sample corr(np[j]) at the time point np[j] is kept as the peak, the peak searcher 14 may again trigger the flag peak_valid at the time point nv[j]=(np[j]+Npv) to indicate that the peak searcher 14 has found the peak peak[j] for the peak window PW[j]. The value of peak[j] equals the signal sample corr(np[j]) at the time point np[j]) and corresponds to the cyclic message in the section CP[j].

During the peak search process, the peak calculating period Npv may be a fixed constant, and may have a temporal length (the number of samples covered) determined according to the delay period L1d (i.e., the predicted value of the period L1) such that the peak calculating period Npv is shorter than the delay period L1d. For example, the peak calculating period Npv may equal L1d*(¾).

The period L3[j]=(nv[j]−nv[j−1]) obtained from comparing an interval between two successively trigger flag peak_valid may serve as an estimated value for L3=(L1+L2). Due to the non-ideal factors affecting the signal corr(n), the period L3[j] is not necessarily equal to the real period L3. Thus, before proceeding to Step 106, the process 10 may iterate Step 104 for a number of times to respectively provide a plurality of corresponding periods L3[j] for a plurality of cyclic messages and accordingly to provide a plurality of estimated values for the period L3.

In Step 106, the histogram counter 16 performing a histogram counting on the period L3[j] to provide a histogram result 20, as shown in FIG. 6. The histogram counter 16 sorts the time difference (np[j]−np[j−1]) (or nv[j]−nv[j−1]) between two successive peaks to one of a plurality of bins H[1] to H[M], so that the apparatus 10 is enabled to determine the temporal length of the guarded interval L2 according to the histogram result 20. The histogram counter 16 may set the number of bins according to the candidate guard intervals to respectively correspond the ranges of the bins to the candidate guard intervals.

In an embodiment of the invention, the M number of bins H[1] to H[M] may correspond to M number of candidate guard intervals. The M number of candidate guard intervals are incrementally arranged from L2c[1] to L2c[M] (i.e., L2c[m−1]<L2c[m]), where m=2 to M) to respectively correspond to the bins H[1] to H[M]. That is to say, the range of the bin H[m] corresponds to the candidate guard interval Lc2[m]. For example, for m that is greater than 1 and smaller than M, the range of the bin H[m] may be defined by the periods (L2c[m−1]+L2c[m])/2) and (L2c[m−1]+L2c[m+1])/2). When the difference (L3[j]−L1d) between the period L3[j] and the delay period L1d (Step 102) falls between the periods (L2c[m−1]+L2c[m])/2) and (L2c[m−1]+L2c[m+1])/2), an accumulation count may be added in the bin H[m]. Further, upper and lower limits of the bins H[1] and H[M] may be respectively set according to (L2c[1]+L2c[2])/2 and (L2c[M−1]+L2c[M]).

In an embodiment, the wireless communication system has four candidate guard intervals L2c[1] to L2c[4] (i.e., M=4), which respectively equal to L1/32, L1/16, L1/8 and L1/4. Therefore, four bins H[1] to H[4] are generated after the histogram counting.

In Step 108, the histogram result 20 is obtained after sorting the plurality of periods (e.g., periods L3[j−1] and L3[j]) to the bins H[1] to H[M], and the apparatus 10 of the invention then determines the temporal length L2 of the guard interval according to the histogram result 20. For example, supposing the accumulated count of a particular bin H[m0] is the largest, the guard interval L2 selected at the transmitter equals the candidate guard interval L2c[m0]. Accordingly, the receiver is able to detect the temporal length of the guard interval I2 to accomplish the blind test for communication parameters.

In Step 106 of another embodiment, a plurality of periods L3[j] obtained by iterating Step 104 are averaged to obtain an average period L3_mean (not shown). The average period L3_mean is then sorted to one of the bins H[1] to H[M] in Step 108. Supposing the a time difference between the average period L3_mean and the delay period L1d falls within a particular bin H[m0], it is determined that the guard interval L2 selected at the transmitter equals the candidate guard interval L2c[m0], thereby also accomplishing the blind test for communication parameters.

In Step 110, at the time point nv[j] when the peak searcher 14 triggers the flag peak_valid in Step 104, the ratio calculator 18 is also triggered to record a signal average mean[j], as shown in FIG. 5. Regarding the time point nv[j] as a reference, the ratio calculator 18 provides a signal average mean[j] according to an average of the signal corr(n) over an average calculating period. In an embodiment, the signal average mean[j]={corr(nv[j]−Nm+1)+corr(nv[j]−Nm+2)+ . . . +corr(nv[j])}/Nm. The average calculating period Nm may be a fixed constant in a value smaller than the peak calculating period Npv. For example, the average calculating period Nm may equal the period L1d/2. After obtaining the peak peak (nv[j]) at the time point nv[j] (Step 104) and the signal average mean[j], the ratio calculator 18 further calculates a ratio peak[j]/mean[j] between the peak peak[j] and signal average mean[j].

In Step 112, the ratio calculator 18 compares whether the ratio peak[j]/mean[j] is greater than a threshold Thr to detect whether the signal x(n) carries valid information. When the ratio peak[j]/mean[j] is greater than the threshold Thr, it means the signal x(n) carries valid data, and the ratio calculator 18 reflects the presence of valid information by use of an appropriate flag (not shown). Conversely, when the peak peak[j] and the signal average mean[j] are close to each other such that the ratio peak[j]/mean[j] between the peak peak[j] and the signal average mean[j] is smaller than the threshold THr, it means the signal x(n) is noise with invalid information. Accordingly, the signal x(n) is detected to determine whether it carries valid information at the same time when detecting the temporal length of the guard interval L2. The value of the threshold THr may be set according to characteristics of the wireless communication system (e.g., ambient operating environment).

Step 104 may be iterated to obtain a plurality of peaks peak[j] and signal averages mean[j], and so statistics may be complied for a plurality of ratios peak[j]/mean[j] to accordingly determine whether valid information is present. For example, the ratios peak[j]/mean[j] are averaged to obtain an average ratio, and it is determined whether valid information is present according to the average ratio. Alternatively, a histogram counting may also be performed on the ratios peak[j]/mean[j]. When majority of the ratios peak[j]/mean[j] is greater than the threshold THr while minority of the ratios peak[j]/mean[j] is smaller than the threshold THr, it is determined that the signal x(n) carries valid information.

In Step 102, the autocorrelation signal corr(n) is obtained according to the signal x(n) after setting the value of the delay period L1d. In the event that the delay period L1d does not match the period L1 selected at the transmitter, the ratio peak[j]/mean[j] obtained in Step 110 is then smaller than the threshold THr. At this point, the delay period L1d may be updated to a period L1 of another mode, and Steps 102 to 112 are repeated according to the updated delay period Dd. When repeating Steps 102 to 112, the updated delay period L1d equals the period L1 selected at the transmitter if the ratio peak[j]/mean[j] is greater than the threshold THr. Therefore, the apparatus 10 of the invention is capable of detecting not only the temporal length of the period L1 but also the temporal length of the period L2. After repeating the process 100 based on different lengths of period L1 possibly selected at the transmitter, in the event that the apparatus 10 finds that the ratio peak[j]/mean[j] is consistently smaller than the threshold THr, it is determined that the signal x(n) carries no valid information.

In Step 106, the temporal length of the period L2 is detected via the histogram counting. Due to non-ideal factors affecting the signal corr(n), the period L3[j] is not necessarily equal to the real period L3. For example, a plurality of periods L3[j] may shift from the period L3 by similar offsets, e.g., the periods L3[j−1]=(L3+L_shift_a) and L3[j]=(L3+L_shft_b), and the offset L_shift_a is close to the offset L_shift_b. Under such circumstances, an average value of a plurality of periods L3[j] is also shifted from the period L3 to undesirably affect the detection for the period L2. However, the histogram counting is capable of displaying distributions of accumulated counts of the periods L3[j], and so the present invention effectively mitigates the influences of the non-ideal factors since the distributions of accumulated counts are immune from the approximate offsets. For example, if majority of the periods L3[j] are accumulated in a same bin, the majority of the periods L3[j] are still gathered in a same bin even the approximate offsets are added to all the periods L3[j].

In FIG. 2, the apparatus 10 of the invention may be integrated in a communication process (e.g., a baseband processing chip); the auto correlator, the peak searcher 14, the histogram counter 16 and the ratio calculator 18 may respectively be realized by software, hardware and/or firmware.

It is seen from Steps 102 to 108 that, the temporal length of the period L2 may be detected by performing Steps 102 to 108 only once instead of having repeatedly performing the steps for different candidate guard intervals. Therefore, compared to the conventional technique, the present invention is capable of quickly accomplishing the blind test for communication parameters and at the same time detecting whether the communication signal carries valid information, thereby optimizing overall communication performance.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of detecting a temporal length of a guard interval for a communication signal, the communication signal comprising a plurality of cyclically arranged cyclic messages each having a duration of the guard interval, the method comprising:
   providing an autocorrelation signal according to the communication signal;
   searching the autocorrelation signal to provide a corresponding peak for each of the cyclic messages;
   performing a histogram counting to sort a time difference between two successive peaks to one of a plurality of bins; and
   determining the temporal length of the guard interval according to a result of the histogram counting.

2. The method according to claim 1, wherein the temporal length of the guard interval is selected from a plurality of candidate guard intervals, and the step of providing the autocorrelation signal is providing the autocorrelation signal according to a shortest candidate guard interval of the candidate guard intervals.

3. The method according to claim 1, wherein the temporal length of the guard interval is selected from a plurality of candidate guard intervals, and the step of providing the autocorrelation signal comprises:
   delaying the communication signal by a delay period to provide a delay signal;
   setting an accumulation period according to a shortest candidate guard interval of the candidate guard intervals; and
   accumulating a product of the communication signal and the delay signal in the accumulation period.

4. The method according to claim 3, between every two successive cyclic messages being a first period, the method further comprising:
   setting the delay period according to the first period.

5. The method according to claim 1, wherein the step of searching the peaks in the autocorrelation signal comprises:
   comparing a current value of the autocorrelation signal with the peak, and updating the peak to the current value when the current value is greater than the peak or else keeping the peak unchanged; and
   triggering a peak flag when a period of keeping the peak unchanged gets greater than a peak calculating period.

6. The method according to claim 5, further comprising:
   delaying the communication signal by a delay period to provide a delay signal;
   providing the autocorrelation signal according to the delay signal and the communication signal; and
   setting the peak calculating period according to the first period in a way that the peak calculating period is smaller than the delay period.

7. The method according to claim 5, further detecting whether the communication carries valid information, the method further comprising:
   when the peak flag is triggered, providing a signal average according to an average of the autocorrelation signal over an average calculating period; and comparing whether a ratio between the peak and the average is greater than a threshold to detect whether the communication signal carries valid information.

8. The method according to claim 1, wherein the temporal length of the guard interval is selected from a plurality of candidate guard intervals, and the step of performing the histogram counting further comprises:

setting a number the bins according to a number of the candidate guard intervals.

9. The method according to claim 8, wherein the step of performing the histogram counter further comprises:

corresponding a range of the bins to the candidate guard intervals, respectively.

10. An apparatus of detecting a temporal length of a guard interval for a communication signal, the communication signal comprising a plurality of cyclically arranged cyclic messages each having a duration of the guard interval, the apparatus comprising:

an auto correlator, for providing an autocorrelation signal according to the communication signal;

a peak searcher, coupled to the auto correlator, for searching the autocorrelation signal to provide a corresponding peak for each of the cyclic messages;

a histogram counter, coupled to the peak searcher, for performing a histogram counting to sort a time difference between two successive peaks to one of a plurality of bins, so as to determine the temporal length of the guard interval according to a result of the histogram counting.

11. The apparatus according to claim 10, wherein the temporal length of the guard interval is selected from a plurality of candidate guard intervals, and the auto correlator provides the autocorrelation signal according to a shortest candidate guard interval of the candidate guard intervals when the auto correlator provides the autocorrelation signal.

12. The apparatus according to claim 10, wherein the temporal length of the guard interval is selected from a plurality of candidate guard intervals, and the auto correlator provides the autocorrelation signal by steps of:

delaying the communication signal by a delay period to provide a delay signal;

setting an accumulation period according to a shortest candidate guard interval of the candidate guard intervals; and accumulating a product of the communication signal and the delay signal in the accumulation period.

13. The apparatus according to claim 12, wherein between every two successive cyclic messages is a first period, and the auto correlator further sets the delay period according to the first period.

14. The apparatus according to claim 10, wherein the peak searcher searches the peak in the autocorrelation signal comprises steps of:

comparing a current value of the autocorrelation signal with the peak, and updating the peak to the current value when the current value is greater than the peak or else keeping the peak unchanged; and triggering a peak flag when a period of keeping the peak unchanged gets greater than a peak calculating period.

15. The apparatus according to claim 14, wherein the auto correlator delays the communication signal by a delay period to provide a delay signal, and provides the autocorrelation signal according to the delay signal and the communication signal; and the peak searcher further sets the peak calculating period according to the delay period in a way that the peak calculating period is smaller than the delay period.

16. The apparatus according to claim 14, further detecting whether the communication signal carries valid information, the apparatus further comprising:

a ratio calculator, coupled to the peak searcher, for providing a signal average according to an average of the autocorrelation signal over an average calculating period when the peak flag is triggered, and comparing whether a ratio between the peak and the average is greater than a threshold to detect whether the communication signal carries valid information.

17. The apparatus according to claim 10, wherein the temporal length of the guard interval is selected from a plurality of candidate guard intervals, and the histogram counter sets a number of the bins according to a number of the candidate guard intervals.

18. The apparatus according to claim 17, wherein the histogram counter corresponds a range of the bins to the candidate guard intervals, respectively.

* * * * *